United States Patent [19]

Wagener et al.

[11] 4,203,833

[45] May 20, 1980

[54] CONVEYING AND CLASSIFYING OF PARTICULATE SUBSTANCES

[75] Inventors: Heinrich Wagener, Bochum; Karl-Heinrich van Heek, Essen, both of Fed. Rep. of Germany

[73] Assignee: Bergwerksverband GmbH, Essen, Fed. Rep. of Germany

[21] Appl. No.: 935,108

[22] Filed: Aug. 21, 1978

[30] Foreign Application Priority Data

Aug. 20, 1977 [DE] Fed. Rep. of Germany ....... 2737635

[51] Int. Cl.$^2$ .............................................. B07B 4/08
[52] U.S. Cl. .................................. 209/139 R; 209/159
[58] Field of Search ................................. 209/138–142, 209/147, 149, 154, 158, 474, 486, 498, 499, 490, 512, 500, 11, 159; 55/431; 302/26, 53, 41; 34/57 A, 57 C, 57 R, 10; 222/195

[56] References Cited

U.S. PATENT DOCUMENTS

| | | | |
|---|---|---|---|
| 3,407,929 | 10/1968 | Hoing | 209/474 |
| 4,049,321 | 9/1977 | Bunting | 302/41 |
| 4,115,929 | 9/1978 | Staub et al. | 34/57 A |

FOREIGN PATENT DOCUMENTS 2203544 8/1973 Fed. Rep. of Germany .......... 209/138

Primary Examiner—Tim R. Miles
Attorney, Agent, or Firm—Michael J. Striker

[57] ABSTRACT

A method and an apparatus are disclosed for classifying particulate substances. A mix of heavier and lighter particles is confined between upwardly divergent side walls and a fluidizing gas is blown into the mix from below. A conveying conduit is arranged below the sidewalls and has vertical conduit portions which have upper open ends communicating with the space between the sidewalls. A classifying gas is blown through the conduit and the conduit portions at a pressure which is higher than that of the fluidizing gas to keep the lighter particles from entering the upper open ends, but which is sufficiently low so that the heavier particles can overcome the pressure of the classifying gas and drop through the upper open ends into the conveying conduit from which they are periodically expelled by bursts of a transporting gas.

26 Claims, 5 Drawing Figures

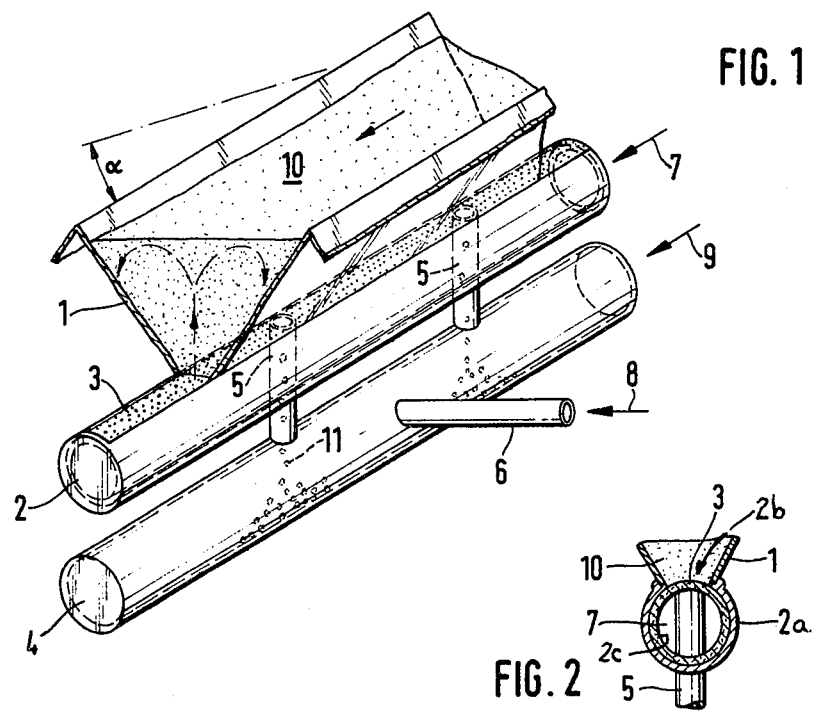
FIG. 1
FIG. 2
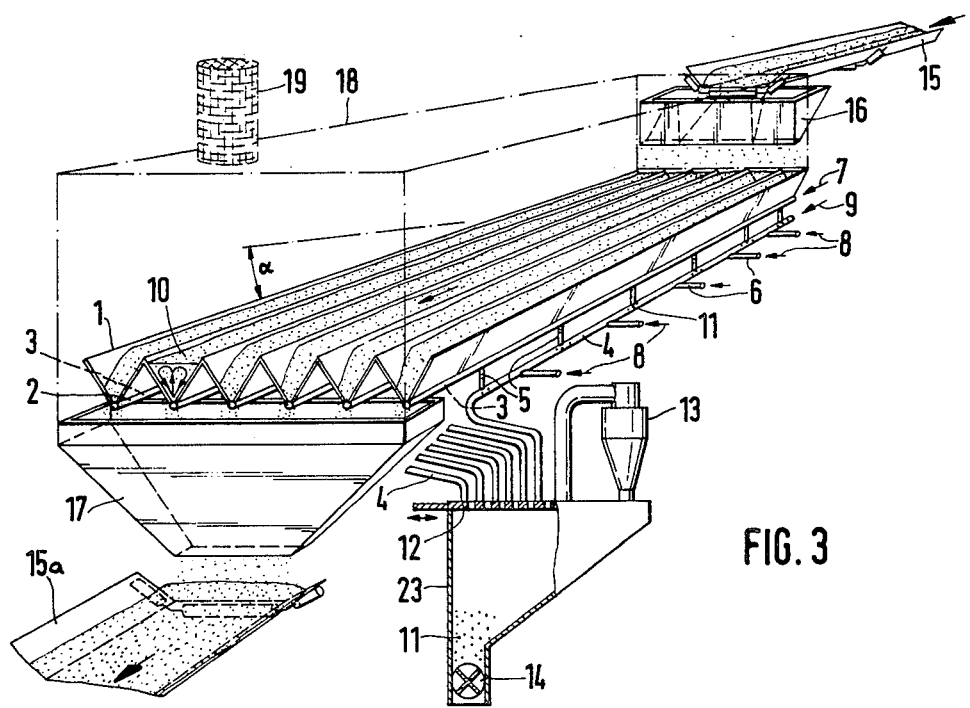
FIG. 3

CONVEYING AND CLASSIFYING OF PARTICULATE SUBSTANCES

BACKGROUND OF THE INVENTION

1. Field of the Invention

The present invention relates to the conveying and classifying of particulate substances.

More particularly, the invention relates to a method of, and an apparatus for, conveying and classifying particulate solids.

2. The Prior Art

In many fluidized-bed processes it is necessary to remove heavier and/or larger particles from a mix containing such particles together with lighter and/or smaller particles. Such processes include, inter alia, the contacting of solid particles with catalysts, aromatics or thermal-energy carriers, the roasting, carbonizing or gasifying of particulate materials, and the separation of pyrites and rock from ground coal. They also include the separation of sintered mineral-ash residue from the fluidized bed of a gasifying reactor and the separation of larger and/or heavier agglomerates (which develop during the course of a process) from a fluidized bed or a moving non-fluidized bed.

A fluidized-bed reactor has been proposed for this purpose in German Published Application OS No. 2,203,544. However, for a variety of reasons it is desirable to provide further improvements.

SUMMARY OF THE INVENTION

Accordingly, it is an object of the invention to provide such improvements.

More particularly, it is an object of the present invention to provide an improved method and apparatus for conveying and classifying particulate solids.

Another object is to provide such a method and apparatus which provide for improved efficacy of particulate-solids transportation and classification.

In keeping with these objects, and still others which will become apparent hereafter, one aspect of the invention resides in a method of conveying and simultaneously classifying a mixture of lighter and heavier particles, comprising the steps of confining the mixture in a substantially horizontal travel path which is bounded by two upwardly divergent side walls; providing below the path an enclosed passageway which extends along the path and communicates with the same from below via the open ends of a plurality of upright passages spaced from one another longitudinally of the path; directing a stream of fluidizing fluid at a first pressure from below and in upward direction into the path, so as to fluidize the mixture therein, whereby portions of the mixture are made to travel repeatedly past the open ends; and admitting through the passages and open ends streams of classifying fluid into the fluidized bed at a second pressure which is sufficiently higher than the first pressure to substantially prevent the lighter particles from entering said open ends but is sufficiently low to permit the heavier particles to overcome it and to drop through the open ends and passages into the passage way.

When reference is made herein to "heavier" particles, this means particles having a greater density than others in the mix and which are therefore heavier than those other particles while being no larger than, or even smaller than, those other particles. Reference to "larger" particles herein means particles which are larger than others in the mix and which, due to their greater size, are heavier than the other particles although their density is no greater than that of the other particles.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary, somewhat diagrammatic illustration of one embodiment of the invention;

FIG. 2 is a cross-sectional detail view of a modification;

FIG. 3 is a somewhat diagrammatic perspective view, illustrating a further embodiment of the invention;

DESCRIPTION OF PREFERRED EMBODIMENTS

Figure 4:
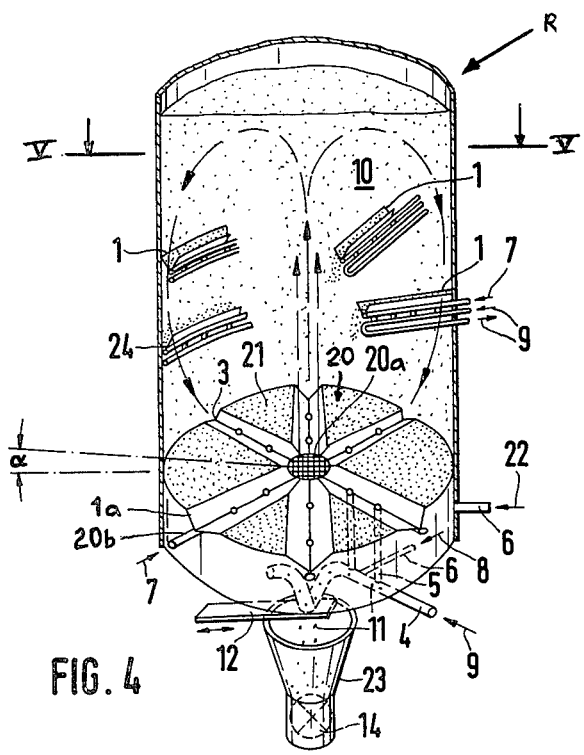
FIG. 4 is a diagrammatic vertical section through a fluidized-bed reactor incorporating another embodiment of the invention.

The method and apparatus according to the invention will hereafter be conjointly described with reference to the appended Figures.

A first embodiment of an apparatus according to the invention, and suitable for carrying out the method, is illustrated in FIG. 1.

It will be seen to comprise a supply conduit 2 for a fluidizing gas 7. The conduit 2 may be of circular (shown) or polygonal (e.g., square, rectangular) cross-section. An upwardly facing strip-shaped longitudinally extending portion 3 of the conduit 2 is pervious to the fluidizing gas; this may be achieved by providing the portion 3 with a row (or several parallel rows) of holes. Alternatively, the portion 3 of conduit 2 may be of an otherwise pervious (e.g., sintered) material, or it may be constituted of a strip of such material which is secured in or over a continuous or discontinuous slot in the wall of conduit 2.

Mounted on the conduit 2 in any suitable manner (e.g., by welding or adhesive bonding) are two walls 1 of smooth-surfaced fluid-impervious material, such as e.g., metal or synthetic plastic material. These walls 1 are mounted at opposite lateral sides of the portion 3 and together form a trough the cross-section of which diverges in direction upwardly away from the portion 3 at an angle of between substantially 20° and 160°; a currently preferred angle of divergence is about 60°. It is generally preferred for the walls to extend parallel to the longitudinal axis of conduit 2; however, especially in the case of a relatively large-diameter polygonal conduit 2 the walls 1 could also extend somewhat skew to this axis. Furthermore, although conduit 2 and walls 1 may extend horizontally, conveying of the particulate material forming the fluidized bed 10 in the trough defined by the walls 1 is facilitated if the conduit 2 and the walls 1 are downwardly inclined relative to the horizontal (in the conveying direction) at an angle α which may be chosen at will, between about 0.1° and 10°.

The closest spacing between the walls 1 (i.e., at the lower end of the trough) may be chosen in dependence upon the desired fluidized bed movement, the angle of divergence of the walls 1, the dimensions of conduit 2 and the fluid-permeability of the portion 3; it can be readily determined empirically without requiring undue experimentation.

Fluidizing gas 7 which is admitted into the conduit 2 penetrates upwardly through the portion 3 into the material of bed 10, fluidizing the bed and causing fountain-like particle movement in the bed as indicated by the arrows.

A material conveying conduit 4 is located beneath the conduit 2 and a plurality of longitudinally spaced upright classification conduits have their lower ends in communication with the interior of the conduit 4; their upper end portions penetrate through the conduit 2 (in sealed manner) and their upper open ends are located at the upper surface of the portion 3. The diameter of these conduits 5 is advantageously equal to between 3 times to a maximum of five times of the particle diameter of the particles which are to be removed from the fluidized bed 10. This diameter ratio facilitates the desirable entry of particles into the conduits 5 one-by-one (rather than the entry of two or more particles simultaneously).

Uniformly distributed over the length of conduit 4 and communicating with it, are a plurality of pipes 6 through which additional fluidizing gas 8 (for better distinction hereafter called classifying gas) is continuously admitted into the conduit 4 and from there via the conduits 5 into the bed 10. The flow speed of the gas 8 admitted through the pipes 6 is somewhat higher than that of the gas 7 (i.e., somewhat higher than required to fluidize the bed 10) but it is smaller than required to cause floating (in the bed 10) of heavier and/or larger particles in the bed 10 which are to be separated from the bed. The weight of these particles therefore overcomes the upward flow of the classifying gas 8 and these particles (designated with reference numeral 11) thus drop through the conduits 5 into the conduit 4. From there they are periodically expelled by a burst of entraining gas 9 which is admitted into conduit 4. These bursts also serve to clear the conduits 5 of any agglomerations or other accumulations of material.

A very important aspect of the invention is the movement of the particles in the fluidized bed 10. Due to the fact that the fluidizing gas 7 enters the trough defined by the walls 1 in a stream of relatively narrow width, the bed 10 is fluidized from the center; i.e., the particles of the bed 10 are lifted up at the center of the bed (see the arrows) and then flow outwardly towards the walls 1 along which they descend in downward direction (hence the earlier reference herein to a fountain-like movement). Especially if the arrangement is also inclined to the horizontal (see the angle α) and the bed 10 thus undergoes movement lengthwise of the trough, the two movements thus cooperate to provide for a mode of transportation of the bed 10 in which the moving particles perform a motion corresponding to that of two counter-rotating spirals of cylindrical shape. This movement causes a high turn-over of the particles in the bed 10 so that all portions of the bed frequently pass over the open ends of the conduits 5 and are thus subject to classification.

A modified embodiment of the fluidizing conduits is shown in FIG. 2 and may be employed in FIG. 1 and in all of the succeeding embodiments.

The fluidizing conduit is designated in FIG. 2 with reference numeral 2a and is provided, in place of the portion 3, with a longitudinally extending upwardly facing slot 2b which faces into the trough defined by the walls 1. Mounted in the interior of conduit 2a is a tube 2c of a porous fluid-pervious material of e.g., sintered metal or the like. The strip-shaped portion of the tube 2c which registers with the slot 2b, i.e., which is not covered by the wall of conduit 2a, then constitutes the equivalent of the portion 3. The advantage of this embodiment is, that when the apparatus is shut down and no fluidizing gas 7 is being admitted, none of the particles of bed 10 can drop into the conduit 2a since the porous character of tube 2c does not permit this.

FIG. 3 shows an embodiment which employs a plurality of the arrangements shown in FIG. 1, in parallel relationship. The particulate material to be classified is advanced (see the arrow) on a conveyor 15 from which it drops into a chute 16 which distributes it into the several troughs of the parallel arrangements (each of these corresponds to the one shown in FIG. 1 and all reference numerals used in connection with them are identical with the reference numerals in FIG. 1). It forms in these troughs respective fluidized beds 10 whose material advances towards a collector 17, due to the inclination of all the arrangements at the angle α relative to the horizontal. The collector 17 discharges the material (from which the particles to be classified have been removed) onto another conveyor 15a which carries it away.

The entire apparatus is installed in a dust-proof enclosure (or room) 18. Fluidizing gas 7 and classifying gas 8 exiting from the fluidized beds 10 leaves the enclosure 18 through a vibratory filter 19 (known per se) or through a cyclone (not shown) wherein it is freed of any entrained dust particles; the gas can then be recycled for re-use. The particles intercepted by the filter 19 (or cyclone) can be returned to the conveyor 15 so that they are re-admitted into the troughs. Separated (classified) particles 11 are conveyed through the several conduits 4 by bursts of gas 9 into a hopper 23. Before each burst a slide valve 12 is opened which normally closes off these conduits 4 from the hopper 23. From the latter, the particles 11 are discharged through a rotary star valve 14. The conveying gas 9 is passed through a cyclone 13 where it is freed of entrained dust particles and is then discharged or recycled.

Figure 5:
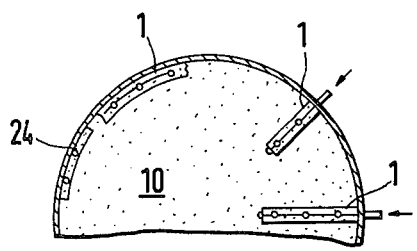
FIG. 5 is a fragmentary, diagrammatic horizontal section taken on the line V—V of FIG. 4.

Finally, FIGS. 4 and 5 illustrate the invention embodied in a fluidized-bed reactor.

The reactor vessel R has a bottom wall or distributor 20 formed at its center with a portion 20a acting as the gas distributor; integrated in the wall 20 are a plurality of conduits (or else conduit passages) 20b. These radiate outwardly from the distributor 20a and are either straight (shown) or curved. The separate walls 1 of the preceeding embodiments are here replaced by functionally equivalent wall portions 1a of the wall 20. The segments 21 between circumferentially adjacent ones of the conduits 20a are downwardly inclined relative to the horizontal at the angle α from the outer edge of the wall 20 towards the distributor 20a at the center of the same; advantageously, they are also convexly curved in circumferential direction. The conduits 20a and the trough formed by the wall portions 1a are also inclined downwardly towards the distributor 20a.

Other elements, corresponding to those of the preceding embodiments, are identified with like reference numerals.

The operation of the embodiment in FIGS. 4 and 5 is the same as in the preceding embodiment except that in addition to the spiral counter-rotating movement of the portions of bed 10 which are located within the troughs formed by the wall portions 1a, the entire bed 10 (i.e., the entire reactor contents) has also impressed upon it a fountain-like movement (see the arrows). Thus, the entire quantity of particles constituting the fluidized bed 10 is constantly made to rise up at the center of the reactor vessel, move to the vessel wall and slide down the same, and to enter the radially outer ends of the troughs to travel back to the center and, in so doing, to undergo classification.

The segments 21 of wall 20 may, but need not be, pervious to fluid. If so, one or more suitable conduits are provided through which an additional fluidizing gas 22 is directed from below against these segments 21 for entry through the same into the bed 10. The flow speed of the gas 22 is so selected that the gas does not actually fluidize the bed 10 (this is the job of gas 7) but that it serves to slightly loosen the particles of the bed in order to facilitate fluidization by the gas 7.

Due to the downward inclination of the segments towards the distributor 20a and their convexity the heavier and/or larger particles of the bed 10 tend to be preferentially transported towards the troughs and to enter these to undergo classification (i.e., removal). The removed particles 11 are discharged in the manner described with reference to FIG. 3.

In addition to the classifying arrangements which are integrated in the bottom wall 20 the reactor vessel may also be provided with further such arrangements at one or more levels above the bottom wall; these further arrangements may be added at the time the reactor is constructed (or originally converted by providing the bottom wall 20 with its associated components) or they may be added later. Such later addition is relatively simple, since the additional arrangements (which correspond e.g., to the one shown in FIG. 1) may be prefabricated as stock so that the requisite lengths can be chosen and installed without difficulty.

The mounting of the additional arrangements may be effected in various ways, any or all of which may be utilized in one and the same reactor vessel R. Thus, the right-hand side of FIG. 4 shows two of these arrangements 1 mounted at different levels to extend radially of the wall of the reactor vessel, whereas the left-hand side shows two such arrangements 1 and 24 also mounted at different levels but extending circumferentially of the vessel wall. All the arrangements are downwardly inclined and the circumferentially extending ones may be mounted at some distance from the vessel wall, if desired. The arrangement 24 has only one wall 1 because the other wall required to form the trough is provided by a portion of the reactor vessel wall.

The diagrammatic sectional view of FIG. 5 shows the arrangements 1 and 24 of FIG. 4 in a top plan view. It will be noted that the conduits 2 and 4 for each of these arrangements penetrate the wall of the reactor vessel R. In the arrangements extending radially of the wall the conduits 4 must either extend across the reactor vessel and out through the opposite side of the wall, or else they must form a bend at the radially inner ends of the arrangements and be led back out through the wall adjacent their point of entry. Alternatively, the conduits 2 and 4 could extend upwardly (from e.g., the inner ends of the arrangements) in the vessel and be secured at or near the top of the same, in order to serve as mounting elements for the arrangements. Otherwise the arrangements may be secured to the vessel wall in suitable manner, e.g., by welding or bolting. The discharge ends of the conduits 4 may all communicate with a common hopper 23 as shown in e.g., FIG. 3, which is provided with the valves 12 and 14.

The invention, especially the embodiment of FIGS. 4 and 5, has advantages in addition to those already outlined. It can be incorporated in conjunction with already known fluidized-bed installations which are used for the thermal treatment (e.g., drying, regeneration, etc.) of solid particles, and permits such installations to effect—in addition to their initial purpose—simultaneously the removal of particles of undesirably large size (e.g., agglomerates) or of particles having a greater density and hence weight (e.g., catalysts, thermal-energy carriers, etc.) than the other particles which are being treated.

Moreover, since the classification (i.e., removal of particles) takes place only at the locations where the conduits 5 are provided, the invention permits the designer to predetermine precisely the area of the fluidized bed (e.g., near the inner end of the respective trough) where the classification is to be effected, merely by locating the conduits 5 in this area. Also, unlike the prior art the mass of particles in the bed is not subjected to undesired pressure fluctuations in the vicinity of the open ends of conduits 5 due to overall pulsating of the fluidized bed; instead, due to the directed spiral advancement described earlier the material of the bed is made to travel again and again to and past the open ends of conduits 5 in a uniform rythm.

It should be understood that fluidization of the bed need not necessarily be effected with a gas; if the transportation, classification (and possibly thermal treatment) of solid particles suspended in a liquid is to be effected, then a liquid can be used to obtain the necessary turn-over of the particles.

The invention may also be utilized in non-fluidized moving beds for direct contacting of different materials under simultaneous separation of larger and/or heavier particles.

To further facilitate an understanding of the invention, the same will be explained with reference to the following

EXAMPLE

Power plant coal, comminuted to a particle size less than 3 mm and containing 8% by weight of ballast matter, was to be classified. The ballast matter was composed of 90% pyrites having a bulk density of about 4.7 g/cm$^3$ and 10% minerals (matrix matter) having a bulk density of about 1.6 g/cm$^3$. The bulk density of the pure coal itself was about 0.7 g/cm$^3$. It was desired to remove about 75% of the ballast matter.

An apparatus corresponding to the embodiment of FIG. 1 was used, having the walls 1 including an angle of 60° between themselves. The smallest transverse spacing between the walls at the bottom of the trough defined by them was 1 cm. The portion 3 was constituted by forming the conduit 2 with a single row of holes having a diameter of 2 mm and a spacing of 5 mm between consecutive holes. The portion 3 was interrupted at 10 cm intervals by the open end of a respective classifying conduit 5 having an inner diameter of 7 mm.

The conduit 2 and the trough formed by the walls 1 were inclined (from the inlet end to the outlet end) by 1° relative to the horizontal.

In operation, the comminuted coal including the ballast matter filled the trough to an average height of about 25 cm. Material was admitted into the inlet end of the trough at a rate of 5 Kg/sec; i.e., about 400 g of ballast matter was admitted to the inlet end per second. Air at room temperature was used both as the fluidizing gas and as the classifying gas.

The flow speed of the fluidizing gas was 0.4 m/sec. and the flow speed of the classifying gas was 7.8 m/sec., both considered with reference per square centimeter surface area of the portion 3.

Under these conditions, 300 g/sec. of ballast material were removed from the fluidized bed. Quite surprisingly, only small amounts of actual coal particles were found in the removed ballast material, and these were particularly large coal particles which often were found to be intergrown with ballast-material particles.

While the invention has been illustrated and described as embodied in the treatment of coal particles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of conveying and simultaneously classifying a mixture of lighter and heavier particles, comprising the steps of confining the mixture in an inclined substantially horizontal travel path which is laterally bounded by two upwardly divergent side walls and has a length and a width; providing below said path an enclosed passageway which extends along the path and communicates with the same from below via the open ends of a plurality of upright passages spaced from one another longitudinally of the path; directing a stream of fluidizing fluid at a first pressure from below and in upward direction into said path substantially centrally between said side walls, so as to fluidize the mixture therein for travel lengthwise of said path and whereby portions of the mixture are also made to travel repeatedly past said open ends; and admitting through said passages and open ends streams of classifying fluid into the fluidized bed at a second pressure which is sufficiently higher than said first pressure to substantially prevent the lighter particles from entering said open ends but is sufficiently low to permit the heavier particles to overcome it and to drop through said open ends and passages into said passageway.

2. A method as defined in claim 1, wherein the step of directing comprises causing said stream of fluidizing fluid to enter said path midway of the transverse dimension of the path, so as to cause the particles of the mixture to be raised up at the middle of said path during fluidization and to travel upwardly and outwardly towards said walls to thereupon slide downwardly along the latter.

3. A method as defined in claim 1; and further comprising the step of periodically conveying the heavier particles along and out of said passageway by admitting bursts of a conveying fluid into the same.

4. Apparatus for conveying and simultaneously classifying a mixture of heavier and lighter particles, comprising first means defining an inclined substantially horizontal travel path which is laterally bounded by two upwardly divergent side walls and has a length and a width; second means defining below said path an enclosed passageway which extends along the path, including a plurality of upright classifying conduits having lower open ends communicating with said passageway and upper open ends communicating with said path; third means for directing a stream of fluidizing fluid at a first pressure from below and substantially centrally between said side walls in upward direction into said path, so as to fluidize the mixture therein, whereby portions of the mixture are also made to travel repeatedly past said upper open ends; and fourth means for admitting through said passageway and said conduits streams of classifying fluid into the fluidized bed at a second pressure which is sufficiently higher than said first pressure to substantially prevent the lighter particles from entering said open ends but is sufficiently low to permit the heavier particles to overcome it and to drop through said open ends and said classifying conduits into said passageway.

5. Apparatus as defined in claim 4; and further comprising means for intermittently admitting bursts of a conveying fluid into said passageway to transport the classified heavier particles along and out of said passageway.

6. Apparatus as defined in claim 4, wherein said side walls together define a trough of upwardly divergent cross-section.

7. Apparatus as defined in claim 4, wherein said side walls diverge from one another in upward direction at an angle of between substantially 20°–160°.

8. Apparatus as defined in claim 7, wherein said angle is substantially 60°.

9. Apparatus as defined in claim 4, wherein said third means comprises a fluidizing conduit interposed between said first and second means and extending lengthwise of both of the same, said fluidizing conduit having a strip-shaped upper portion facing upwardly into said path defined between said side walls, said upper portion being pervious to said fluidizing fluid and said classifying conduits extending through said fluidizing conduit normal thereto and having said upper open ends located in said strip-shaped upper portion.

10. Apparatus as defined in claim 9, wherein said fluidizing conduit extends parallel to the elongation of said path.

11. Apparatus as defined in claim 9, wherein said fluidizing conduit extends skew to the elongation of said path.

12. Apparatus as defined in claim 4, wherein said path has an inlet end and an outlet end for the mixture, said first means being inclined downwardly relative to the horizontal from said inlet end to said outlet end.

13. Apparatus as defined in claim 12, wherein said first means is inclined to the horizontal at an angle of about 1°.

14. Apparatus as defined in claim 4, wherein said first means defines a plurality of said paths in side-by-side parallel relation, each of said paths being defined by two of said upwardly divergent side walls and all of said paths being downwardly inclined relative to the horizontal in direction from one to another end of the respective paths.

15. Apparatus as defined in claim 4, wherein said first means defines a plurality of said paths and said second means defines a plurality of said passageways; further comprising a collecting chamber with which all of said passageways communicate to discharge the classified larger particles thereinto, said chamber having an outlet; and a rotary star valve installed in said outlet.

16. Apparatus as defined in claim 4, said apparatus further comprising a fluidized-bed reactor vessel having a bottom wall, and at least said first means including said side walls being integral parts of said bottom wall.

17. Apparatus as defined in claim 16, wherein said side walls are constituted by portions of said bottom wall and said path is recessed in an upper surface of said bottom wall.

18. Apparatus as defined in claim 17, wherein said first means defines a plurality of said paths, all radiating outwardly from a center of said bottom wall.

19. Apparatus as defined in claim 18, wherein sid bottom wall comprises wall segments located between circumferentially successive ones of said paths, said wall segments being fluid permeable.

20. Apparatus as defined in claim 18, wherein said bottom wall is dished and said paths are all downwardly inclined toward said center.

21. Apparatus as defined in claim 18, said reactor vessel comprising an upright circumferential wall; and further comprising additional first through fourth means mounted on said circumferential wall upwardly spaced from said bottom wall, said additional first means defining additional paths.

22. Apparatus as defined in claim 21, wherein said additional paths are located at a plurality of levels on said circumferential wall.

23. Apparatus as defined in claim 21, wherein said additional paths extend radially inwardly from said circumferential wall.

24. Apparatus as defined in claim 21, wherein said additional paths extend tangentially of the center of said reactor vessel.

25. Apparatus as defined in claim 21, wherein said additional paths extend circumferentially of said circumferential wall.

26. Apparatus as defined in claim 21, wherein said additional paths are inclined downwardly in direction toward said bottom wall.

* * * * *